United States Patent
Kabra et al.

(10) Patent No.: US 10,635,693 B2
(45) Date of Patent: *Apr. 28, 2020

(54) EFFICIENTLY FINDING POTENTIAL DUPLICATE VALUES IN DATA

(71) Applicant: International Business Machines Corporation, Armonk, NY (US)

(72) Inventors: Namit Kabra, Hyderabad (IN); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 603 days.

This patent is subject to a terminal disclaimer.

(21) Appl. No.: 15/349,421

(22) Filed: Nov. 11, 2016

(65) Prior Publication Data

US 2018/0137189 A1    May 17, 2018

(51) Int. Cl.
| | |
|---|---|
| *G06F 7/00* | (2006.01) |
| *G06F 16/28* | (2019.01) |
| *G06F 16/25* | (2019.01) |
| *G06F 16/2455* | (2019.01) |
| *G06F 16/2457* | (2019.01) |
| *G06F 16/215* | (2019.01) |

(52) U.S. Cl.
CPC .......... *G06F 16/285* (2019.01); *G06F 16/215* (2019.01); *G06F 16/24553* (2019.01); *G06F 16/24578* (2019.01); *G06F 16/258* (2019.01)

(58) Field of Classification Search
CPC ............. G06F 16/285; G06F 16/24553; G06F 16/215; G06F 16/258; G06F 16/24578
See application file for complete search history.

(56) References Cited

U.S. PATENT DOCUMENTS

| | | | | |
|---|---|---|---|---|
| 6,092,038 A | * | 7/2000 | Kanevsky | ............... H03M 7/30 704/257 |
| 8,666,998 B2 | | 3/2014 | Nelke et al. | |
| 8,756,207 B2 | | 6/2014 | Rineer | |
| 2013/0185327 A1 | * | 7/2013 | Biesenbach | ........... G06F 16/334 707/769 |

(Continued)

FOREIGN PATENT DOCUMENTS

WO    2014111959 A2    7/2014

OTHER PUBLICATIONS

List of IBM Patents or Patent Applications Treated as Related, Dec. 7, 2017, pp. 1-2.

(Continued)

*Primary Examiner* — Azam M Cheema
(74) *Attorney, Agent, or Firm* — Winstead PC

(57) ABSTRACT

A method, system and computer program product for finding groups of potential duplicates in attribute values. Each attribute value of the attribute values is converted to a respective set of bigrams. All bigrams present in the attribute values may be determined. Bigrams present in the attribute values may be represented as bits. This may result in a bitmap representing the presence of the bigrams in the attribute values. The attribute values may be grouped using bitwise operations on the bitmap, where each group includes attribute values that are determined based on pairwise bigram-based similarity scores. The pairwise bigram-based similarity score reflects the number of common bigrams between two attribute values.

20 Claims, 6 Drawing Sheets

(56) References Cited

U.S. PATENT DOCUMENTS

2015/0379430 A1 12/2015 Dirac et al.

OTHER PUBLICATIONS

"Clustering in Depth," https://github.com/OpenRefine/OpenRefine/wiki/Clustering-In-Depth, 2013, pp. 1-4.
IBM, "Identifying Duplicates in Your Data Using InfoSphere Quality Stage," http://www.ibm.com/developerworks/data/library/techarticle/dm-1505duplicates-infosphere-qualitystage/index.html, Jun. 30, 2015, pp. 1-19.
IBM, "InfoSphere Best Practices: Use InfoSphere Information Analyzer Data Classification to Understand the Quality of Your Data," http://www.ibm.com/developerworks/data/library/techarticle/dm-1018infoanalyzerquality/index.html, Oct. 21, 2010, pp. 1-9.
Hassanzadeh et al., "Framework for Evaluating Clustering Algorithms in Duplicate Detection," http://dblab.cs.toronto.edu/~fchiang/docs/vldb09.pdf, Proceedings of the VLDB Endowment, vol. 2, No. 1, Aug. 2009, pp. 1282-1293.
Catalysoft, "How to Strike a Match," http://www.catalysoft.com/articles/StrikeAMatch.html, 2016, pp. 1-9.
Office Action for U.S. Appl. No. 15/834,738 dated Oct. 18, 2019, pp. 1-22.
Office Action for U.S. Appl. No. 15/834,738 dated Feb. 21, 2020, pp. 1-11.

\* cited by examiner

| 501 | 503 |
|---|---|
| 501.1 — LINCOLN MARK VIII ==> | LI,IN,NC,CO,OL,LN,MA,AR,RK,VI,II — 503.1 |
| 501.2 — CHEVEROLETTE MALIBU=> | CH,HE,EV,VE,ER,RO,OL,LE, — 503.2<br>ET,TE,MA,AL,LI,IB,BU |
| CAMREY TOYOTA ==> | CA,AM,MR,RE,EY,TO,OY,YO,OT,TA — 503.3 |
| NISSAN MAXMA ==> | NI,IS,SS,SA,AN,MA,AX,XM,MA |
| EXPLOROR, FORD ==> | EX,XP,PL,LO,OR,RO,FO,RD |
| 04 NISAN MAXIMA ==> | NI,IS,SA,AN,MA,AX,XI,IM,MA |
| 98 CHEVY SUBURBAN ==> | CH,HE,EV,VY,SU,UB,BU,UR,<br>RB,BA,AN |
| VOLVO C70 CONVERT ==> | VO,OL,LV,CO,ON,NV,VE,ER,RT |
| TOYOTA CAMRY ==> | TO,OY,YO,OT,TA,CA,AM,MR.RY |
| 501.10 — CHEVROLET MALIBU ==> | CH,HE,EV,VR,RO,OL,LE,ET,MA, — 503.10<br>AL,LI,IB,BU |

| | AL | AM | AN | AR | AX | BA | BU | CA | CH | CO | ER | ET | EV | EX | EY | FO | HE | IB | II |
|---|---|---|---|---|---|---|---|---|---|---|---|---|---|---|---|---|---|---|---|
| 502.1 | 0 | 0 | 0 | 1 | 0 | 0 | 0 | 0 | 0 | 1 | 0 | 0 | 0 | 0 | 0 | 0 | 0 | 0 | 1 |
| 502.2 | 1 | 0 | 0 | 0 | 0 | 0 | 1 | 0 | 1 | 0 | 1 | 1 | 1 | 0 | 0 | 0 | 1 | 1 | 0 |
| 502.3 | 0 | 1 | 0 | 0 | 0 | 0 | 0 | 1 | 0 | 0 | 0 | 0 | 0 | 0 | 1 | 0 | 0 | 0 | 0 |
| | 0 | 1 | 1 | 0 | 1 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 1 | 0 | 1 | 0 | 0 | 0 |
| | 0 | 1 | 1 | 0 | 1 | 0 | 0 | 0 | 0 | 0 | 0 | 0 | 0 | 0 | 0 | 0 | 0 | 0 | 0 |
| | 0 | 0 | 1 | 0 | 0 | 1 | 1 | 0 | 1 | 0 | 0 | 0 | 1 | 0 | 0 | 0 | 1 | 0 | 0 |
| | 0 | 0 | 0 | 0 | 0 | 0 | 0 | 0 | 1 | 1 | 0 | 0 | 0 | 0 | 0 | 0 | 0 | 0 | 0 |
| | 0 | 1 | 0 | 0 | 0 | 0 | 0 | 1 | 0 | 0 | 0 | 0 | 0 | 0 | 0 | 0 | 0 | 0 | 0 |
| 502.10 | 1 | 0 | 0 | 0 | 0 | 0 | 1 | 0 | 1 | 0 | 0 | 1 | 1 | 0 | 0 | 0 | 1 | 1 | 0 |

| IM | IN | IS | LE | LI | LN | LO | LV | MA | MR | NC | NI | NV | OL | ON | OR | OT | OY | PL | RB | RD | RE |
|---|---|---|---|---|---|---|---|---|---|---|---|---|---|---|---|---|---|---|---|---|---|
| 0 | 1 | 0 | 0 | 1 | 1 | 0 | 0 | 1 | 0 | 1 | 0 | 0 | 1 | 0 | 0 | 0 | 0 | 0 | 0 | 0 | 0 |
| 0 | 0 | 0 | 1 | 1 | 0 | 0 | 0 | 1 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 1 | 1 | 0 | 0 | 0 | 0 | 1 |
| 0 | 0 | 1 | 0 | 0 | 0 | 0 | 1 | 0 | 0 | 1 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 1 | 0 | 0 | 1 | 0 | 1 | 0 | 0 |
| 0 | 0 | 1 | 0 | 0 | 0 | 0 | 1 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 1 | 0 | 0 | 0 | 1 | 1 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 1 | 1 | 0 | 0 | 0 | 0 | 0 | 0 |
| 0 | 0 | 0 | 1 | 1 | 0 | 0 | 0 | 1 | 0 | 0 | 0 | 1 | 0 | 0 | 0 | 0 | 0 | 0 | 0 | 0 | 0 |

| RK | RO | RT | RY | SA | SS | SU | TA | TE | TO | TT | UB | UR | VE | VI | VO | VR | VY | XI | XM | XP | YO |
|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 1 | 0 | 0 | 0 | 0 | 0 | 0 | 0 | 0 |
| 0 | 1 | 0 | 0 | 0 | 0 | 0 | 1 | 0 | 1 | 0 | 0 | 1 | 0 | 0 | 0 | 0 | 0 | 0 | 0 | 0 | 0 |
| 0 | 0 | 0 | 0 | 0 | 0 | 1 | 0 | 1 | 0 | 0 | 0 | 0 | 0 | 0 | 0 | 0 | 0 | 0 | 0 | 0 | 1 |
| 0 | 0 | 0 | 0 | 1 | 1 | 0 | 0 | 0 | 0 | 0 | 0 | 0 | 0 | 0 | 0 | 0 | 0 | 1 | 0 | 0 | 0 |
| 0 | 1 | 0 | 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 1 | 0 | 0 | 0 | 0 | 0 | 0 | 0 | 0 | 0 | 0 | 0 | 1 | 1 | 0 | 0 | 0 | 0 |
| 0 | 0 | 0 | 0 | 0 | 1 | 0 | 0 | 0 | 0 | 1 | 1 | 0 | 0 | 0 | 1 | 0 | 0 | 0 | 0 | 0 | 0 |
| 0 | 0 | 1 | 0 | 0 | 0 | 0 | 0 | 0 | 0 | 0 | 1 | 0 | 1 | 0 | 0 | 0 | 0 | 0 | 0 | 0 | 0 |
| 0 | 0 | 0 | 1 | 0 | 0 | 0 | 1 | 0 | 1 | 0 | 0 | 0 | 0 | 0 | 0 | 0 | 0 | 0 | 0 | 0 | 1 |
| 0 | 1 | 0 | 0 | 0 | 0 | 0 | 0 | 0 | 0 | 0 | 0 | 0 | 0 | 0 | 1 | 0 | 0 | 0 | 0 | 0 | 0 |

Fig. 3B

| | AL | AM | AN | AR | AX | BA | BU | CA | CH | CO | ER | ET | EV | EX | EY | FO | HE | IB | II |
|---|---|---|---|---|---|---|---|---|---|---|---|---|---|---|---|---|---|---|---|
| 502.3 | 0 | 1 | 0 | 0 | 0 | 0 | 1 | 0 | 0 | 0 | 0 | 0 | 0 | 1 | 0 | 0 | 0 | 0 | 0 |
| 502.9 | 0 | 1 | 0 | 0 | 0 | 0 | 1 | 0 | 0 | 0 | 0 | 0 | 0 | 0 | 0 | 0 | 0 | 0 | 0 |
| 502.4 | 0 | 1 | 1 | 0 | 1 | 0 | 0 | 0 | 0 | 0 | 0 | 0 | 0 | 0 | 0 | 0 | 0 | 0 | 0 |
| 502.6 | 0 | 1 | 1 | 0 | 1 | 0 | 0 | 0 | 0 | 0 | 0 | 0 | 0 | 0 | 0 | 0 | 0 | 0 | 0 |

| | IM | IN | IS | LE | LI | LN | LO | LV | MA | MR | NC | NI | NV | OL | ON | OR | OT | OY | PL | RB | RD | RE |
|---|---|---|---|---|---|---|---|---|---|---|---|---|---|---|---|---|---|---|---|---|---|---|
| 502.3 | 0 | 0 | 0 | 0 | 0 | 0 | 0 | 0 | 1 | 0 | 0 | 0 | 0 | 0 | 0 | 1 | 1 | 0 | 0 | 0 | 0 | 1 |
| 502.9 | 0 | 0 | 0 | 0 | 0 | 0 | 0 | 0 | 1 | 0 | 0 | 0 | 0 | 0 | 1 | 1 | 0 | 0 | 0 | 0 | 0 | 0 |
| 502.4 | 0 | 0 | 1 | 0 | 0 | 0 | 0 | 0 | 1 | 0 | 0 | 1 | 0 | 0 | 0 | 0 | 0 | 0 | 0 | 0 | 0 | 0 |
| 502.6 | 0 | 0 | 1 | 0 | 0 | 0 | 0 | 0 | 1 | 0 | 0 | 1 | 0 | 0 | 0 | 0 | 0 | 0 | 0 | 0 | 0 | 0 |

| | RK | RO | RT | RY | SA | SS | SU | TA | TE | TO | TT | UB | UR | VE | VI | VO | VR | VY | XI | XM | XP | YO |
|---|---|---|---|---|---|---|---|---|---|---|---|---|---|---|---|---|---|---|---|---|---|---|
| 502.3 | 0 | 0 | 0 | 0 | 0 | 0 | 1 | 0 | 1 | 0 | 0 | 0 | 0 | 0 | 0 | 0 | 0 | 0 | 0 | 0 | 0 | 1 |
| 502.9 | 0 | 0 | 1 | 0 | 0 | 0 | 1 | 0 | 1 | 0 | 0 | 0 | 0 | 0 | 0 | 0 | 0 | 0 | 0 | 0 | 0 | 1 |
| 502.4 | 0 | 0 | 0 | 1 | 1 | 0 | 0 | 0 | 0 | 0 | 0 | 0 | 0 | 0 | 0 | 0 | 0 | 0 | 0 | 1 | 0 | 0 |
| 502.6 | 0 | 0 | 0 | 1 | 0 | 0 | 0 | 0 | 0 | 0 | 0 | 0 | 0 | 0 | 0 | 0 | 0 | 0 | 1 | 1 | 0 | 0 |

Fig. 3D

EFFICIENTLY FINDING POTENTIAL DUPLICATE VALUES IN DATA

TECHNICAL FIELD

The present invention relates generally to digital computer systems, and more particularly to finding groups of potential duplicates in attribute values.

BACKGROUND

Finding potential duplicates values (as opposed to exact duplicates) is a problem that several organizations need to solve for over dozens of use cases including fraud detection, maintaining information governance, running their analytics, reduction in storage, Master Data Management, etc. With emergence of Big Data (that implies increase in volume, variety and velocity) dealing with the problem of finding data has become more acute. Traditional algorithms may not be scalable for higher volume of data, nor are they often equipped to deal with variety of data as they often need a prior understanding of the data to properly standardize it and finding duplicates.

SUMMARY

In one embodiment of the present invention, a computer implemented method for finding groups of potential duplicates in attribute values comprises converting each attribute value of the attribute values to a respective set of bigrams. The method further comprises determining all bigrams present in the attribute values. The method additionally comprises representing bigrams present in the attribute values as bits, resulting in a bitmap representing the presence of the bigrams in the attribute values. Furthermore, the method comprises grouping, by a processor, attribute values using bitwise operations on the bitmap, where each group comprises attribute values that are determined based on pairwise bigram-based similarity scores, the pairwise bigram-based similarity score reflecting a number of common bigrams between two attribute values.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 3A-3D are diagrams depicting a method for creating clusters of attribute values at various stages of processing using a bitmap in accordance with an embodiment of the present invention.

DETAILED DESCRIPTION

Figure 1:
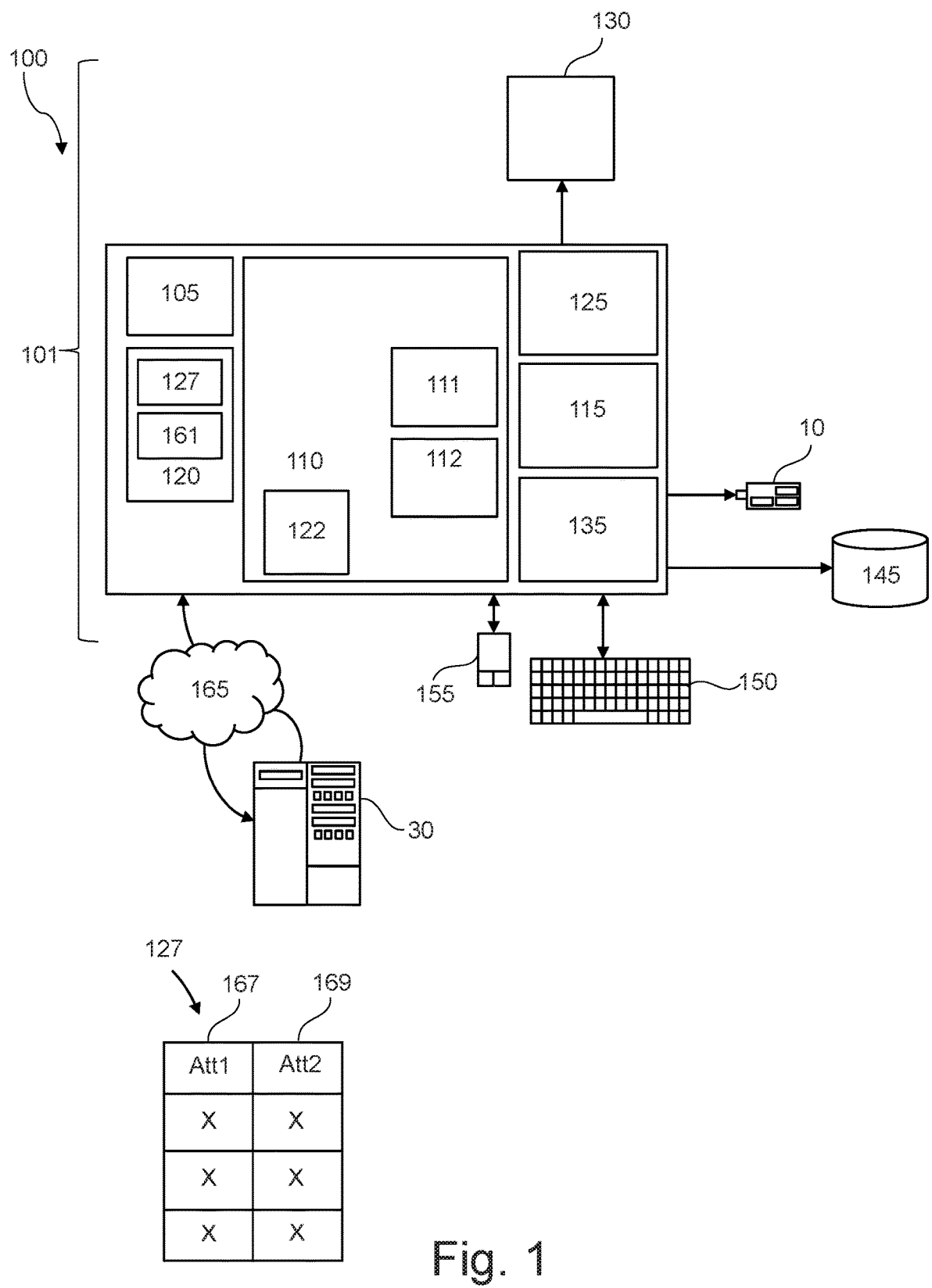
FIG. 1 represents a computerized system, suited for implementing one or more method steps as involved in the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The standardization refers to a process of transforming data to a predefined data format. The data format may include a common data definition, format, representation and structure. The data that is to be transformed is the data that is not conform to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data.

The present method may identify potential duplicates, wherein two values are potential duplicates if the two values are identical duplicates or the two values are not identical yet but they may represent the same entity. For example, the two values may be duplicates (e.g., represent the sane entity or the same attribute value) but may have spelling errors and/or may have a respective order of their constituent parts which is different. For example, the two values "Toyota Camery" and "Camry Toyota".

The present method may be advantageous as it may find in a long list of values, group of values that are likely to be different spelling of the same value. This embodiment works at values level and allows one to identify the 2 single values which are (strictly speaking) different strings (e.g., different spellings of the same value). This is by contrast to conventional methods that cannot detect that 2 values having similar words in a different order are likely to be the same: ex: Rob Alice vs. Alice Robert.

The present method may efficiently cluster the similar data together and also efficiently compare them to find potential duplicates within them without the knowledge of the domain of the data. This may provide an efficient method for finding potential duplicate values, in particular in large set of unclassified data.

Other advantages of the present method may be the following advantages:

Comparing bits is much faster than comparing strings. So this may make the algorithm much more scalable.

The present method may not need prior sorting of the data before comparison which most of the matching algorithm do. Sorting a huge dataset is a time consuming overhead that was avoided.

The present method may not need to do classification/standardization of the data to find potential duplicates.

There is a formula to generate a matching threshold while comparing bits of two attribute values. The formula as described below is the following $(S1 \cap S2)/(S1 \cup S2)$ (the ratio of $(S1 \cap S2)$ and $(S1 \cup S2)$) where S1 is the bits that are set to 1 a first attribute value and S2 is the bits that are set to 1 for a second attribute value.

Converting the data to phonetic (like Metaphone) during preprocessing may reduce drastically the number of bigrams generated and thus make the clustering much faster. The more stricter algorithms, post clustering can very well make up for some of the false positives that could have been generated due to this liberality.

This method may particularly be advantageous to find existence of duplicates in the cleansed Master Data.

For example, if there is a spelling mistake in a bigram then the present method may be able to cluster it together such as for example words PARIS and PAERIS. However, the present method may not group together the terms PARIS and ARIZONA even of presence of the bigram AR, because the present method may take care of this by doing left shift multiple times. So if PARIS and PAERIS do not match in first Bigram comparison, it may get another chance.

According to one embodiment, the grouping of the attribute values comprising: performing a bitwise operation for each pair of attributes values of the attribute values for determining the number of common bigrams between the pair of attribute values, recursively building each group by including a first pair of attribute values in the group and including each further pair of attribute values that shares at least one attribute value with previously included pairs of the group. For example, if val1 is linked to val2 to form the first pair, then put recursively val1, val2 and all values which are directly or indirectly linked to val1 or val2 in the same group. For example, if there are pairs like (val1, val2), (val2, val3) and (val3, val6), the first pair (val1, val2) may be included in the group, and since val2 is linked to val3 in the second pair, the second pair may also be included in the group (e.g., only val3 will be added to the group because val2 already included in the group and no need to duplicate it), then it may be determined that val6 is linked to val3 in the third pair, and thus the third pair may also be included in the group (e.g., only val6 will be added to the group because val3 already included in the group and no need to duplicate it) and the same may be done for other groups.

According to one embodiment, the method further comprises: removing from the bitmap bigrams which are present in all attribute values. This embodiment may reduce the size of the bitmap by rejecting bigrams that may not be useful for the potential duplicates identification. And may thus reduce the processing resources required for processing the bitmap.

According to one embodiment, the method further comprises: for each group of attribute values of the groups that result from the grouping step:

For each pair of attribute values of the group:
  splitting a first attribute value of the pair into first words and a second attribute value of the pair into second words, the first words being constituent parts of the first attribute value, the second words being constituent parts of the second attribute value;
  determining all bigrams present in each first and second words;
  determining pairs of first and second words having a number of common bigrams higher than a predefined threshold;
  determining a word level character-based similarity score for each determined pair of words;
  combining the determined word level character-based similarity scores to determine a character-based similarity score for the pair;
  selecting the pairs of attribute values whose character-based similarity score is higher than a predefined similarity threshold;
  clustering pairs of the selected pairs that share one attribute value into a respective cluster, thereby resulting in one or more clusters.

For example, the first (second) words may be words that are separated by a separator, such as a space or coma, etc. This embodiment may further increase the accuracy of the present method for identification of the potential duplicates.

According to one embodiment, the pairwise bigram-based similarity score is determined only for pairs of attribute values having a difference in length that is smaller than a predefined maximum difference. For example, the two attribute values of the pair may have similar or the same length in order to be compared. This may be advantageous as the attribute values (e.g., strings) may be broken in groups based on size so that only similar sized strings may be compared. This may not group strings like "Paris" and "Arizona tourist office center" together because of size even though they have same bigram "ar". Lengths could be overlapping (0-15/10-25/20-35/ . . . ). This may save processing time that would otherwise be required by comparing those different strings.

According to one embodiment, the pairwise bigram-based similarity score being determined using the number of bit pairs having same bits that two attribute values have. For example, the pairwise bigram-based similarity score may be the ration of the determined number of bit pairs divided by the number of bit pairs that have different bits of the two attribute values. This may provide an accurate scoring method based on accurately identified duplicates.

According to one embodiment, for each group of attribute values: determining for each pair of attribute values a character-based similarity score using a similarity algorithm; selecting the pairs of attribute values whose character-based similarity score is higher than a predefined similarity threshold; clustering pairs of the selected pairs that share one attribute value into a respective cluster, thereby resulting in one or more clusters. Using further similarity check algorithm on top of the potential duplicate algorithm may further increase the accuracy of the present method and may provide cleansed groups. Thus, the resulting score may be more accurate.

According to one embodiment, the determining of the character-based similarity score for the each pair comprising: comparing each word of a first attribute value of the each pair with each word of a second attribute value of the each pair. For example, for each comparison a word-level character-based similarity score may be determined or calculated and the character-based similarity score for the each pair may be a combination (e.g., the sum) of the word-level character-based similarity scores.

According to one embodiment, the method further comprises calculating the data standardization score using the number of groups, wherein the calculating comprises: determining the number of attribute values that are comprised in the clusters, wherein the data standardization score is the ratio of the determined attribute values to the number of attribute values in the dataset. This may provide a reliable estimation of the score in particular for large datasets. This is by contrast to a scoring based on absolute number of duplicates that are found.

According to one embodiment, the similarity algorithm comprises at least one of edit distance and Levenshtein edit distance algorithms. This embodiment may be advantageous as it may seamlessly be integrated with existing systems.

According to one embodiment, the length of the bitmap is determined by the number of different bigrams occurring at least once in the dataset. This may provide reliable decomposition of the attribute values in order to find duplicates.

This is by contrast to determining the length of the bigram as the total number of theoretical possible bigrams.

According to one embodiment, the bigram is a sequence of two or more adjacent elements or characters of the attribute value. The present method may be applied using N-grams as described herein with the 2-grams, wherein the N-gram is a sequence of N adjacent characters of an attribute value.

According to one embodiment, representing bigrams present in the attribute values as binary numbers further comprises removing from the bitmap all columns of bits where the value of the bit is the same for all rows of the bitmap. This may speed up the processing of the present method.

According to one embodiment, the attribute is a string type.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 (e.g., instructions to manage databases, such as a database management system). The memory 110 may further comprise a query optimizer. The query optimizer may comprise instructions (e.g., software instructions that when executed may provide a query execution plan for executing a given query).

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage, such as HDD storage.

The storage 120 may comprise at least one dataset (or data table) 127. For example, the software 112 may receive (automatically or upon request) as input the dataset 127, or may download the dataset 127 from storage 120 or memory 110.

The dataset 127 may comprise one or more columns (e.g., 167-169), wherein each column is represented by a respective attribute "Att1" and "Att2". The rows or records of the dataset 127 may comprise values of the attributes (attributes and columns are used interchangeably). The attributes 167-169 may, for example, be a string type value.

The term "dataset" or data table as used herein refers to a collection of data that may be presented in tabular form. Each column in the data table may represent a particular variable or attribute. Each row in the data table may represent a given member, record or entry of the data table. In another example, the dataset may have a hierarchical structure like JSON or XML format. In another example, the dataset may be represented as a graph, or may be represented in a triplet format like RDD or may have a structured format that may be accessed and used in accordance with the present method. The one or more attributes 167-169 may be described using metadata 161 that may for example be stored in storage 120.

Figure 2:
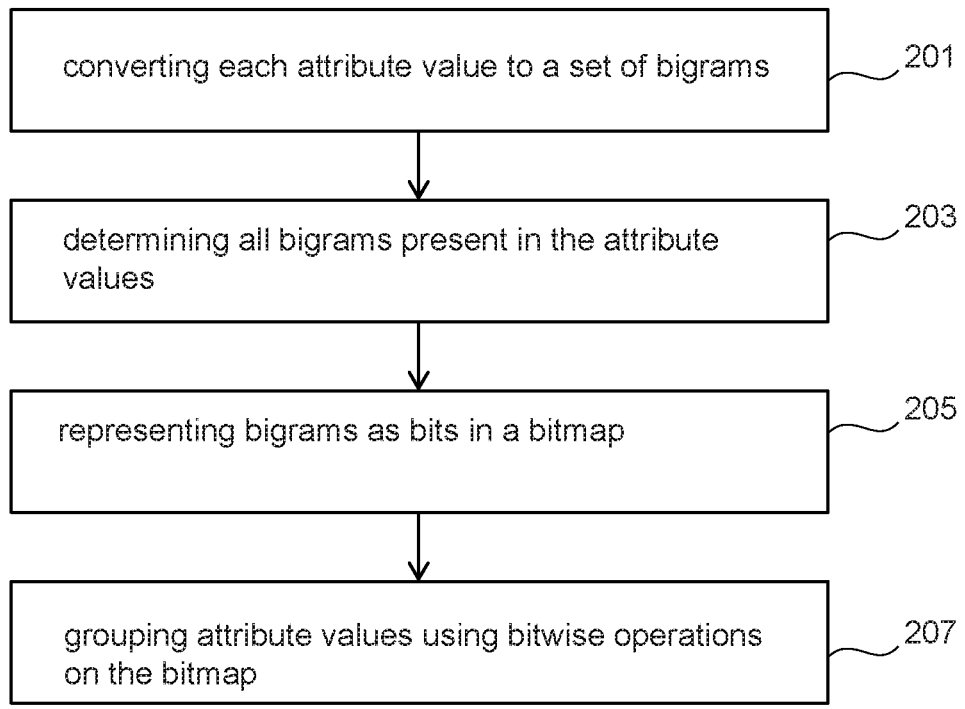
FIG. 2 is a flowchart of a method for finding groups of potential duplicates in accordance with an embodiment of the present invention.

FIG. 2 is a flowchart of a method for finding groups of potential duplicates.

In step 201, each attribute value of at least part of the attribute values of the attribute 167 of the dataset 127 may be converted to a respective set of bigrams. The bigrams may, for example, comprise a sequence of two adjacent elements of the attribute value. For example, if the attribute value is "PATENT", then the set of bigrams of the attribute value "PATENT" is "PA", "AT", "TE", "EN" and "NT".

In one example, before performing step 201 the attribute values may be standardized by for example converting them to lower cases, removing special characters (punctuation, non-letters, etc.) or convert them to soundex, etc.

In one example, the attribute values of the attribute 167 that are in the dataset 127 may be the results of a deduplication algorithm that is applied on the values of the attribute 167 (e.g., the attribute values of the attribute 167 are distinct values). The deduplication algorithm may be configured to remove duplicates from the dataset 127 based on values of the attribute 167. This may be advantageous as it may speed up the present method as it may run on a clean sample. Although two values may be classified as distinct values by the deduplication algorithm, the two values may not be "true" distinct values. For example, the two values may be duplicates but may have spelling errors or may have an order in their constituent parts which is different and thus the deduplication algorithm may not detect them. The two values may be identified as duplicates or potential duplicates by the present method as described herein.

In step 203, all bigrams present in the attribute values of the attribute 167 may be determined. For example, all bigrams may be stored in an array where each element of the array may comprise a bigram and an indication of the corresponding attribute value in the dataset 127.

In step 205, bigrams (e.g., as determined in step 203) present in the attribute values may be represented as binary numbers or as bits. This may result in a bitmap representing the presence of bigrams in the attribute values. The bitmap or the bit array may be an array data structure that compactly stores bits.

The bitmap refers to a bit array (e.g., a two dimensional bit array) in which each set of bits, represents or corresponds to an item e.g. an attribute value. For example, the bitmap may comprise a bit matrix to store two dimensional arrays of 0 or 1 values. The bitmap may comprise m rows and n columns, where m refers to the number of attribute values and n refers to the number of bigrams. Each row in the bitmap may represent a given attribute value (the row comprises the set of bits that corresponds to the given attribute value) and each column in the bitmap may represent a bigram. Each cell of the bitmap has a value of 0 or 1. The value 0 (1) indicates that the attribute value that corresponds to the cell does not comprise (does comprise) the bigram that corresponds to the cell. A 0 or 1 value in the bit matrix uses 1 bit. This data structure may have the advantage of reducing the memory usage compared to a normal data storage.

In order to access the bitmap, the present method may provide information indicating which bigram corresponds to which position in the bitmap (ex: bigram aa corresponds to the 1st bit, bigram ab, the second, etc.) and/or which attribute value corresponds to which position in the bitmap.

For example, the bitmap may be created in step 205 and defined such that each column of bits of the bitmap represents a respective bigram that has been found or determined for one or more attribute values of the attribute 167. The column of bits comprises bits that are sets for each attribute value of the attribute 167. The bitmap comprises a set of bits for each of the attribute values to be processed. The set of bits comprises a number of bits that corresponds to the number of bigrams in all the attribute values to be processed (e.g., each bit in a set of bits corresponds to a respective bigram).

For exemplification purpose, assuming that attribute values to be processed are "PATENT", "ATE", "APTENT", the list of bigrams may comprise "PA", "AT", "TE", "EN", "NT", "AP" and "PT" the bitmap may have the following structure:

|   | TE | AT | PA | EN | NT | AP | PT |
|---|----|----|----|----|----|----|----|
| 1 | 1  | 1  | 1  | 1  | 1  | 0  | 0  |
| 2 | 1  | 1  | 0  | 0  | 0  | 0  | 0  |
| 3 | 1  | 0  | 0  | 1  | 1  | 1  | 1  |

The first row indicates the bits that are associated with the attribute value "PATENT". The bits of the first row are set such that they represent the content of the attribute value "PATENT". Since the attribute value "PATENT" has the bigrams "PA", "AT", "TE", "EN" and "NT", the corresponding bits are set to 1, while the remaining bits that correspond to the other bigrams "AP" and "PT" are set to 0 since none of them is contained in the attribute value "PATENT".

The second row indicates the bits that are associated with the attribute value "ATE". The bits of the second row are set such that they represent the content of the attribute value "ATE". Since the attribute value "ATE" has the bigrams "AT" and "TE", the corresponding bits are set to 1, while the remaining bits that correspond to the other bigrams ""PA", "EN", "NT", "AP" and "PT" are set to 0 since none of them is contained in the attribute value "ATE".

The third row indicates the bits that are associated with the attribute value "APTENT". The bits of the third row are set such that they represent the content of the attribute value "APTENT". Since the attribute value "APTENT" has the bigrams, "TE", "EN", "NT", "AP" and "PT" the corresponding bits are set to 1, while the remaining bits that correspond to the other bigrams "PA" and "AT" are set to 0 since none of them is contained in the attribute value "APTENT".

In step 207, the attribute values may be grouped, which may result in a given number of groups. Each group of the resulting groups may comprise attribute values that have a number of common bigrams that is higher than a predefined minimum number of common bigrams. The grouping may be performed using bitwise operations of sets of bits of pairs of the attribute values to be processed.

Using the above example, among the attribute values "PATENT", "ATE" and "APTENT" groups may be built. For that, three pairs of attribute values may be considered namely: a first pair ("PATENT", "ATE"), second pair ("PATENT", "APTENT") and third pair ("APTENT", "ATE").

For the first pair the bigrams that are in common are "TE" and "AT" which is a number of 2 common bigrams between attribute values "PATENT" and "ATE".

For the second pair the bigrams that are in common are "TE", "EN" and "NT" which is a number of 3 common bigrams between attribute values "PATENT" and "APTENT".

For the third pair there is only one bigram "TE" that is in common between attribute values "APTENT" and "ATE".

In order to determine the number of bigrams (bits) which are present in both attribute values of a pair, an AND bitwise operation between the 2 sets of bits of the pair may be performed. In another example, the number of bigrams which are either present in both or absent in both sets of bits of the pair may be counted using an NOT XOR bitwise operation may be used for defining the pairwise bigram-based similarity score. In another example, bitwise operations may be used to calculate the following similarity between two attribute values A and B: similarity(A, B)=nb_bits_set(A AND B)/nb_bits_set(A OR B). Where bitwise operation nb_bits_set(A AND B) counts the number of bits set to 1 in both attribute values A and B and bitwise operation nb_bits_set(A OR B) counts the number of bits set to 1 in at least one attribute value A and B. A further example is shown with reference to FIGS. 3A-3D.

For example, counting the common number of bits between 2 sets of bits may be performed by applying an AND operation between the 2 sets of bits and counting the number of bits that are set to 1 in the result. These operations may be done very efficiently by a CPU. This common number of bits between two sets of bits may be indicative of the number of common bigrams between the two sets of bits.

For example, for the first pair, the AND result between set of bits of "PATENT" and set of bits of "ATE" is 1100000 which indicates that 2 pairs of bits have same values 1 in the first pair (or two bigrams are present in both attribute values of the first pair).

For the second pair, the AND result between set of bits of "PATENT" and set of bits of "APTENT" is 1001100 which indicates that 3 pairs of bits have same values 1 in the second pair.

For the third pair, the AND result between set of bits of "ATE" and set of bits of "APTENT" is 10000000 which indicates that 1 pair of bits have same values in the third pair.

In order to build a group of attribute values, a pairwise bigram-based similarity score may be determined for each of the three pairs. The pairwise bigram-based similarity score may for example equal to the ration of the common bigrams for a given pair over all bigrams (e.g., that are found in step 203). In this case, the first, second and third pairs may have the bigram-based similarity score of 2/7, 3/7 and 1/7 respectively.

The calculated bigram-based similarity scores may be compared with a predefined threshold (e.g., 0.25 to check whether they are higher than 0.25). In this case, the first and second pairs would service the condition and may then be grouped in one group since they share one attribute value "PATENT". The one group may comprise the attribute values "PATENT", "APTENT" and "ATE".

However, if the predefined threshold is 0.35, then only the second pair would service the condition and may then be used to build or define one group comprising the attribute values "PATENT" and "APTENT".

In one optional further step, a data standardization score may be calculated using the groups. For example, the data standardization score may be defined as the ratio of the determined attribute values to the number of attribute values in the dataset. Using the above example (with threshold 0.25), this ratio is 1 meaning that 100% of the attribute values of the dataset are grouped. By comparing this data standardization score to a score threshold it may be decided whether or not to standardize the attribute values. Using the above example, if the score threshold is 30% then the attribute values PATENT", "APTENT" and "ATE" may be standardized.

Before performing calculating the data standardization score, the groups defined in step 207 may further be processed for checking or running on them other similarity algorithms. For example, the group comprising attribute values PATENT", "APTENT" and "ATE" may further be processed by calculating for the first, second and third pairs a respective character-based similarity score using a similarity algorithm or a word by word comparison as described herein. The similarity algorithm may be at least one of edit distance and Levenshtein edit distance algorithms. If, for example, the character-based similarity score for the first and third pairs are below a given character scoring threshold, then the group may be redefined, such that the attribute value "ATE" is excluded from the group of attribute values PATENT", "APTENT" and "ATE". The resulting group may comprise only PATENT" and "APTENT".

FIGS. 3A-3D illustrate steps for creating clusters of attribute values of the attribute 167 using a bitmap.

FIG. 3A depicts the list of attribute values 501.1 to 501.10 to be processed. Each of the attribute values 501.1-10 is associated with the respective set of bigrams 503.1-503.10 in the attribute value. Attribute values 501.1 to 501.10 may be distinct values. The attribute values 501.1-10 may be stored in a column 501 and corresponding sets of bigrams 503.1-503.10 may be stored in column 503 of the table shown in FIG. 3A.

From the first step that is illustrated by FIG. 3A, the list of bigrams to be found in the attribute or column 501 is determined.

For each attribute value 501.1-10 a respective set of bits 502.1-10 may be created as illustrated in FIG. 3B. In the bitmap 505, each pair of bigrams and associated attribute values is represented by a bit. Bit value of 0 at a position represents that a particular bigram does not exist in the attribute value and 1 indicates that the particular bigram exists in the attribute value. This may end up having a large binary number associated with each attribute value. The 10 attribute values 501.1-10 of the input have 63 different bigrams.

The length of the bitmap may be determined by the number of different bigrams occurring at least once in the full dataset containing attribute values 501. The length of the bitmap indicates the number of bits (referred to as set of bits) associated with each attribute value (e.g., 63 bits).

Figure 3C:
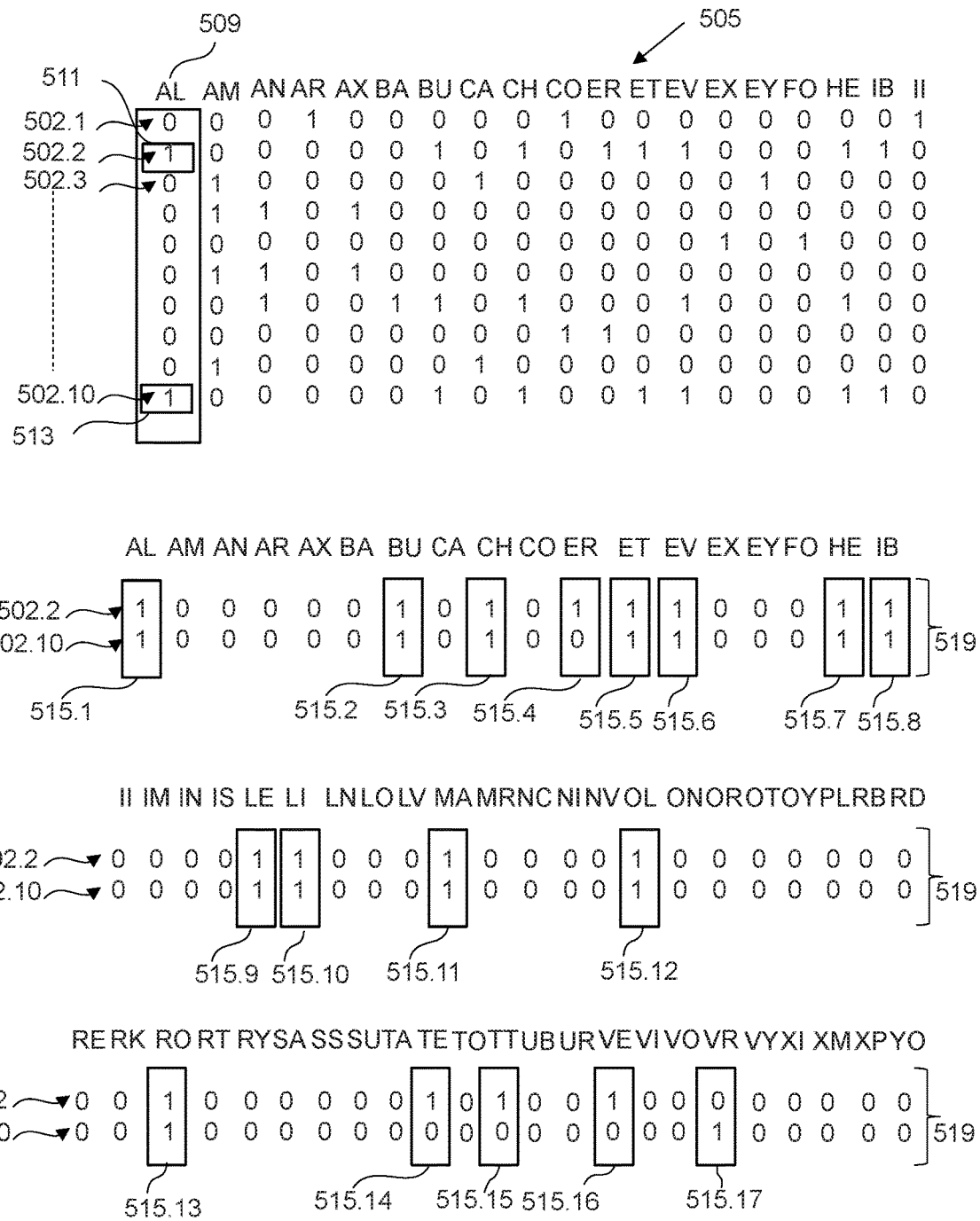

In a following step as illustrated in FIG. 3C, a first bit position (e.g., most left bit of the bitmap) is used to find those bits that return 1 and which are blocked together and compared. As illustrated in FIG. 3C the first position may comprise bit position 509 which represents the bigram "AL". In this example, the 2nd and 10th rows return 1 as values of bits 511 and 513 respectively.

The 2nd and 10th rows or attribute values 501.2 and 501.10 may be compared by comparing the bits within them. The bits of each attribute values 501.2 and 501.10 are further separately listed in FIG. 3C.

For comparing the bits a similarity factor (e.g., the pairwise bigram-based similarity score) may be calculated for the two attribute values 501.2 and 501.10. The similarity factor, Sim(501.2, 501.10), may be defined as follows: Sim(501.2, 501.10)=(S1∩S2)/(S1US2), where S1 is the bits that are set to 1 for attribute value 501.2 and S2 is the bits that are set to 1 for attribute value 501.10. The union (S1US2) refers to the pairs of bits 515.1-515.17, wherein each pair comprises bits corresponding to the two attribute values 501.2 and 501.10 and comprises at least one bit that is set to 1. In the example of FIG. 3C, there are 17 pairs 515.1-17. The intersection (S1∩S2) refers to the pairs of bits of 515.1-3 and 515.5-13, wherein each pair comprises two bits that are set to 1. In the example of FIG. 3C, there are 12 pairs.

Thus, the similarity factor may be: Sim(501.2,501.10) =12/17=0.71.

Since the Similarity is above threshold (e.g., 0.25), the attribute values 501.1 and 501.10 are clustered together as one cluster. One of them may become a cluster leader. Subsequent rows may be only compared to this cluster leader.

Since sufficient clusters are not identified, the step described in FIG. 3C may be repeated by doing a left shift to identify a second bit position 520 which corresponds to bigram "AM" as shown in FIG. 3D. Rows 3, 4, 6 and 9 (represented by set of bits 502.3, 502.4, 502.6 and 502.9) of the bitmap 505 or attribute values 501.3, 501.4, 501.6 and 501.9 return 1 and are compared with each other by calculating the similarity factor as defined above.

Sim (501.3, 501.4)=0.05 is below threshold 0.25 thus attribute values 501.3 and 501.4 are not clustered together.

Sim (501.3, 501.6)=0.05 is below threshold 0.25 thus attribute values 501.3 and 501.6 are not clustered together.

Sim (501.3, 501.9)=0.72 is higher than the threshold, thus attribute values 501.3 and 501.9 are clustered together in cluster 523.

Sim (501.4, 501.6)=0.80 is higher than the threshold, thus attribute values 501.4 and 501.6 are clustered together in cluster 521.

Sim (501.4, 501.9) and Sim (501.6, 501.9) are not performed as attribute value 501.9 was already moved to cluster 523.

Sim (501.2, 501.3)=0 is below threshold 0.25 thus attribute values 501.2 and 501.3 are not clustered together.

Sim (501.2, 501.4)=0.04 is below threshold 0.25 thus attribute values 501.2 and 501.4 are not clustered together.

Since sufficient clusters (3) are identified, an exit may be performed or the clusters may be further refined by performing a word by word comparisons as described herein (e.g., with reference to phase 4). For example, the following 3 clusters are identified, values within which may further be compared with another string algorithm (UNCERT, etc.).

Cluster 519 has attribute values 501.2 and 501.10: CHEVEROLETTE MALIBU and CHEVROLET MALIBU.

Cluster 523 has attribute values 501.3 and 501.9: TOYOTA CAMRY and CAMREY TOYOTA.

Cluster 521 has attribute values 501.4 and 501.6: NISSAN MAXMA and NISAN MAXIMA.

If over 25% of the attribute values 501.1-10 are covered in the clusters with more than 1 record then the above exit may be performed (e.g., no repeating of step of FIG. 3C is required) or a further refined clustering may be performed at word level.

The scoring may be performed as follow:

If 25% and above covered in clusters with more than 1 record

Score=1.0

Else

Score=Max(1.0, (% covered)*4/100).

For example, if the number of attribute values for which at least one duplicate attribute value has been found is 25% of the total number of attribute values, the result may be maximized to 1.0 because enough number of attribute values with a potential duplicate value is found which gives a high confidence that the standardization is needed for the attribute values.

The present method may have be advantageous as comparing 10 distinct values would have traditionally required n*(n+1)/2 comparisons. So from 55 comparisons, the present method brought down the comparison to just 5.

Another example for processing the bitmap 505 in order to find duplicates may comprise the following steps: splitting the bitmaps in groups of 64 bigrams (which corresponds to 64 bits per attribute value) which can be easily processed by the CPU as 64 bits long numbers. Thus for each attribute value N long number may be obtained. The attribute values may be sorted by their first long numbers and compare within sorted result each attribute value with only the next M values following it (e.g., M=10 values) in order to find pairs of duplicate values. This operation may be repeated by sorting by the 2nd long number of each attribute value and determine if in that order new pairs of similar or duplicate values can be found, etc.

In the following different phases of a method for funding duplicates is provided:

Phase 1: standardize and transform to bigram bitmap. In this phase 1 the following may be performed:

Receive a List of Values

For each value, apply a standardization function (standardization can be convert to lower-case, and/or remove special chars, and/or remove fill words, and/or convert to soundex).

Compute the bigrams of the standardize value and convert into a bigram bitmap

Phase 2: compress/reorganize resulting bitmap. In this phase 2 the following may be performed:

Remove from the bitmap all bigrams which are present in all values or present in no values (remove from the bitmap all columns of bits where the value of the bit is the same for all row of the bitmap)

Phase 3: Cluster bitmap to find group of rows which have nearly the same bits. This phase may, for example, comprise at least part of the method of FIG. 2.

Phase 4: Deeper search within each identified cluster. In this phase 4 the following may be performed:

For each group of values with identical bigram patterns, identified in Phase 3

If the 2 values appear to be already linked (directly or indirectly) with each other by a previous step, go to the next pair For each pair of values within that group, do a more precise value/value comparison using word matching and edit distance to compute a precise similarity score If the similarity score between the 2 values is above threshold, link the 2 values together The similarity check of Phase 4 may, for example, be performed as follows: For each pair of value within the group of values having similar bigrams Split both values into the different words composing them Compute bigram bitmap for each word split in previous step Compare the bigrams bitmap of each word of the first value with each word of the second value and map each word of the first value with the word of the second value having the most similar bigrams Ex: Yannick Saillet vs. Sailet Yannik=>Yannick→Yannik; Saillet→Sailet For each pair of words mapped in the previous step Apply an edit distance algorithm to compute the precise similarity of both words Compute a final similarity score between the 2 values aggregating the precise similarity computed in the previous step at word level Phase 5: build the final clusters. In this phase 5 the following may be performed:

Go through all links identified in Phase 4 between pair of values and build group of values which are all directly or indirectly linked with each other (ex: if val1 is linked to val2), then put recursively val1, val2 and all values which are directly or indirectly linked to val1 or val2 in the same cluster.

Present the group of values to the user for review or further actions.

In another example, a computer-implemented method for finding groups of potential duplicates is provided. The method comprises: receiving a set of strings (values); converting each string to a respective set of bigrams; determining all bigrams present in the set of strings; representing bigrams present in the set of strings as binary numbers, resulting in a bitmap representing the presence of bigrams in the set of strings; grouping the set of strings to groups by: selecting a first bit position and checking which strings have the bigram corresponding to the first bit position; assigning strings having the bigram corresponding to the first bit position to a first group based on pairwise bigram-based similarity scores, the pairwise bigram-based similarity score reflecting how many bigrams two string have in common; selecting a second bit position and checking which still-non-assigned strings have the bigram corresponding to the second bit position and assigning strings to a second group based on pairwise bigram-based similarity scores; exiting this iterative grouping step once a predefined exit criterion is met.

For example, strings within each group may be linked together based on pairwise character-based similarity scores (e.g., Levenshtein or other edit-distance score). The final clusters/groups of similar strings may be determined based on the linking. Thus, the proposed grouping/clustering algorithm can be used as a pre-step for Levenshtein or other edit-distance algorithms (that may not scale well). Those algorithms can then be run on each group to determine the final clusters/duplicates.

An example approach to calculate the potential duplicates may comprise: converting each attribute value (string) to a respective set of bigrams; determining all bigrams present in the attribute values; representing bigrams present in the attribute values as binary numbers; determining similarity scores of attribute values pairs based on how many bigrams the attribute value pairs share, the determining being done by bit operations on the binary numbers representing the attribute values; clustering the attribute values based on the similarity score.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for finding groups of potential duplicates in attribute values, the computer program product comprising a computer readable storage medium having program code embodied therewith, the program code comprising the programming instructions for:
   converting each attribute value of the attribute values to a respective set of bigrams;
   determining all bigrams present in the attribute values;
   representing bigrams present in the attribute values as bits, resulting in a bitmap representing the presence of the bigrams in the attribute values; and
   grouping attribute values using bitwise operations on the bitmap, wherein each group comprises attribute values that are determined based on pairwise bigram-based similarity scores, the pairwise bigram-based similarity score reflecting a number of common bigrams between two attribute values.

2. The computer program product of claim 1, the grouping of attribute values comprising the programming instructions for:
   selecting a first bit position in the bitmap and checking which set of attribute values have the bigram corresponding to the first bit position;
   grouping attribute values having the bigram corresponding to the first bit position in one or more groups, wherein each group comprises attribute values of the set of attribute values that are determined based on pairwise bigram-based similarity scores, the pairwise bigram-based similarity score reflecting the number of common bigrams between two attribute values; and
   in case a number of groups is smaller than a predefined threshold repeating the selecting and grouping steps using a second bit position and non-grouped attribute values until the number of groups is higher than the predefined threshold or until all bits are processed.

3. The computer program product as recited claim 1, wherein the grouping of the attribute values comprises the programming instructions for:

performing a bitwise operation for each pair of attributes values of the attribute values for determining a number of common bigrams between the pair of attribute values, recursively building each group by including a first pair of attribute values in the group and including each further pair of attribute values that shares at least one attribute value with previously included pairs of the group.

4. The computer program product as recited claim 1, wherein the pairwise bigram-based similarity score is determined using a number of bit pairs having same bits of two attribute values.

5. The computer program product as recited in claim 1, wherein the program code further comprises the programming instructions for: for each group of attribute values:
   determining for each pair of attribute values in the group a character-based similarity score using a similarity algorithm;
   selecting the pairs of attribute values whose character-based similarity score is higher than a predefined similarity threshold; and
   clustering pairs of the selected pairs that share one attribute value into a respective cluster, thereby resulting in one or more clusters.

6. The computer program product as recited in claim 5, wherein the program code further comprises the programming instructions for:
   calculating a data standardization score using a number of groups comprising:
      determining a number of attribute values that are comprised in the clusters, the data standardization score being a ratio of the determined attribute values to the number of attribute values in a dataset.

7. The computer program product as recited in claim 5, wherein the similarity algorithm comprises at least one of edit distance and Levenshtein edit distance algorithms.

8. The computer program product as recited in claim 5, wherein the determining of the character-based similarity score for the each pair comprises the programming instructions for:
   comparing each word of a first attribute value of the each pair with each word of a second attribute value of the each pair.

9. The computer program product as recited in claim 1, wherein the program code further comprises the programming instructions for: for each group of attribute values:
   for each pair of attribute values of the group:
      splitting a first attribute value of the pair into first words and a second attribute value of the pair into second words, the first words being constituent parts of the first attribute value, the second words being constituent parts of the second attribute value;
      determining all bigrams present in each first and second words;
      determining pairs of first and second words having a number of common bigrams higher than a predefined threshold;
      determining a word level character-based similarity score for each determined pair of words; and
      combining the determined word level character-based similarity scores to determine a character-based similarity score for the pair;
   selecting the pairs of attribute values whose character-based similarity score is higher than a predefined similarity threshold; and
   clustering pairs of the selected pairs that share one attribute value into a respective cluster, thereby resulting in one or more clusters.

10. The computer program product as recited in claim 1, wherein a length of the bitmap is determined by a number of different bigrams occurring at least once in a dataset.

11. A system, comprising:
    a memory unit for storing a computer program for finding groups of potential duplicates in attribute values; and
    a processor coupled to the memory unit, wherein the processor is configured to execute the program instructions of the computer program comprising:
       converting each attribute value of the attribute values to a respective set of bigrams;
       determining all bigrams present in the attribute values;
       representing bigrams present in the attribute values as bits, resulting in a bitmap representing the presence of the bigrams in the attribute values; and
       grouping attribute values using bitwise operations on the bitmap, wherein each group comprises attribute values that are determined based on pairwise bigram-based similarity scores, the pairwise bigram-based similarity score reflecting a number of common bigrams between two attribute values.

12. The system of claim 11, the grouping of attribute values comprising:
    selecting a first bit position in the bitmap and checking which set of attribute values have the bigram corresponding to the first bit position;
    grouping attribute values having the bigram corresponding to the first bit position in one or more groups, wherein each group comprises attribute values of the set of attribute values that are determined based on pairwise bigram-based similarity scores, the pairwise bigram-based similarity score reflecting the number of common bigrams between two attribute values; and
    in case a number of groups is smaller than a predefined threshold repeating the selecting and grouping steps using a second bit position and non-grouped attribute values until the number of groups is higher than the predefined threshold or until all bits are processed.

13. The system as recited claim 11, wherein the grouping of the attribute values comprises:
    performing a bitwise operation for each pair of attributes values of the attribute values for determining a number of common bigrams between the pair of attribute values, recursively building each group by including a first pair of attribute values in the group and including each further pair of attribute values that shares at least one attribute value with previously included pairs of the group.

14. The system as recited claim 11, wherein the pairwise bigram-based similarity score is determined using a number of bit pairs having same bits of two attribute values.

15. The system as recited in claim 11, wherein the program instructions of the computer program further comprise: for each group of attribute values:
    determining for each pair of attribute values in the group a character-based similarity score using a similarity algorithm;
    selecting the pairs of attribute values whose character-based similarity score is higher than a predefined similarity threshold; and
    clustering pairs of the selected pairs that share one attribute value into a respective cluster, thereby resulting in one or more clusters.

16. The system as recited in claim 15, wherein the program instructions of the computer program further comprise:
calculating a data standardization score using a number of groups comprising:
determining a number of attribute values that are comprised in the clusters, the data standardization score being a ratio of the determined attribute values to the number of attribute values in a dataset.

17. The system as recited in claim 16, wherein the similarity algorithm comprises at least one of edit distance and Levenshtein edit distance algorithms.

18. The system as recited in claim 16, wherein the determining of the character-based similarity score for the each pair comprises:
comparing each word of a first attribute value of the each pair with each word of a second attribute value of the each pair.

19. The system as recited in claim 11, wherein the program instructions of the computer program further comprise: for each group of attribute values:
for each pair of attribute values of the group:
splitting a first attribute value of the pair into first words and a second attribute value of the pair into second words, the first words being constituent parts of the first attribute value, the second words being constituent parts of the second attribute value;
determining all bigrams present in each first and second words;
determining pairs of first and second words having a number of common bigrams higher than a predefined threshold;
determining a word level character-based similarity score for each determined pair of words; and
combining the determined word level character-based similarity scores to determine a character-based similarity score for the pair;
selecting the pairs of attribute values whose character-based similarity score is higher than a predefined similarity threshold; and
clustering pairs of the selected pairs that share one attribute value into a respective cluster, thereby resulting in one or more clusters.

20. The system as recited in claim 11, wherein a length of the bitmap is determined by a number of different bigrams occurring at least once in a dataset.

* * * * *